United States Patent [19]
Asada et al.

[11] 3,956,152

[45] May 11, 1976

[54] MAGNETIC RECORDING MEDIA

[75] Inventors: Seiich Asada, Kokubunji; Masahiro Amemiya, Hachioji; Michiharu Seki, Fuchu, all of Japan

[73] Assignee: Hitachi, Ltd., Japan

[22] Filed: Oct. 23, 1973

[21] Appl. No.: 408,670

[30] Foreign Application Priority Data
- Mar. 16, 1973  Japan .............................. 48-30100
- Mar. 7, 1973  Japan .............................. 48-26110
- Oct. 23, 1972  Japan .............................. 47-105300

[52] U.S. Cl. ........................... 252/62.51; 252/62.55
[51] Int. Cl.² ........................................ C01G 37/02
[58] Field of Search ....................... 252/62.51, 62.55

[56] References Cited
UNITED STATES PATENTS

| | | | |
|---|---|---|---|
| 2,923,683 | 2/1960 | Ingraham et al. ................. | 252/62.51 |
| 3,117,093 | 1/1964 | Arthur et al. ..................... | 252/62.51 |
| 3,371,043 | 2/1968 | Hund et al. ....................... | 252/62.51 |
| 3,547,824 | 12/1970 | Mihara et al. .................... | 252/62.51 |
| 3,583,917 | 6/1971 | Mihara et al. .................... | 252/62.51 |

FOREIGN PATENTS OR APPLICATIONS 1,955,896  5/1971  Germany ........................ 252/62.51

*Primary Examiner*—Jack Cooper
*Attorney, Agent, or Firm*—Craig & Antonelli

[57] ABSTRACT

A magnetic recording medium or composition which comprises a ferromagnetic chromium dioxide product containing a proper quantity of tungsten alone or admixed with a member selected from the group consisting of copper and zinc, which has an excellent ferromagnetic characteristic of high coercive force.

5 Claims, 5 Drawing Figures

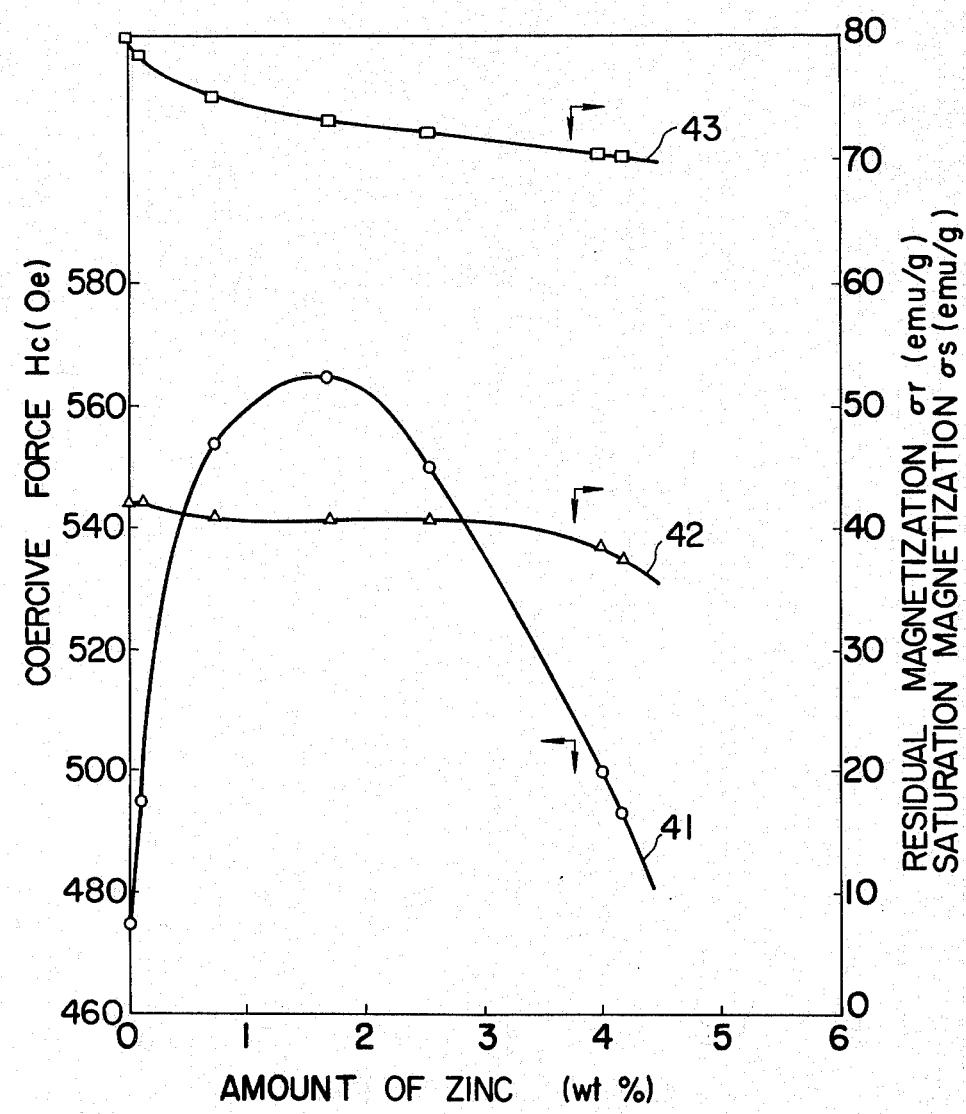

MAGNETIC RECORDING MEDIA

BACKGROUND OF THE INVENTION

This invention relates to a ferromagnetic chromium dioxide product modified by tungsten alone or further with copper and/or zinc to obtain a high coercive force, and to a method for producing the same.

More particularly, this invention relates to ferromagnetic chromium dioxide product suitable for use mainly in magnetic recording media such as magnetic tape, magnetic disc and the like.

As is generally known, a powdery magnetic material having hitherto been exclusively used for magnetic recording media is ferromagnetic iron oxide ($\gamma$-$Fe_2O_3$).

Quite recently, however, ferromagnetic chromium oxide has become attractive for use as magnetic recording media. As compared with conventionally known $\gamma$-$Fe_2O_3$, the ferromagnetic chromium oxide comprising chromium dioxide has superior characteristics, particularly superior magnetic characteristics, such as a higher value of saturation magnetization, lower electric resistance, smaller demagnetization under pressure, and less divergence between the direction of the axis of crystal anisotropy and that of the axis of shape anistropy. Nevertheless, chromium dioxide exhibits the greatest disadvantage in a small coercive force, which retarded its coming into practical use. In order to be used in magnetic recording media, chromium dioxide must be improved in its coercive force to 200 Oe. or higher, while, on the other hand, the most important problem has been how the improvement should be done. It was not until recent years that methods for preparing chromium dioxide having a high coercive force began to be made public. It has been known that the following patents, for example, were issued.

Japanese Pat. Publication No. 8839/61 discloses a method which comprises incorporating ruthenium dioxide, an antimony compound, or a tin compound into chromium trioxide, and thermally decomposing the resulting mixture under a high pressure.

U.S. Pat. No. 3,117,093 discloses a method which comprises thermally treating under a high pressure a chromium oxide, in which the chromium atom has a valence greater than 4 and less than 6, and also teaches that a high coercive force can be obtained by incorporating additives such as antimony oxide.

As is apparent from the description of those patents, it has become known that the addition of a certain effective additive during synthesis of said chromium dioxide is an efficient means of obtaining a ferromagnetic chromium dioxide product having a high coercive force.

SUMMARY OF THE INVENTION

An object of this invention is to provide a ferromagnetic chromium dioxide having high coercive force and large value of residual magnetization, and a method of its preparation.

The intended ferromagnetic chromium dioxide composition or product contains 0.4 to 8% by weight (based on the amount of ferromagnetic chromium dioxide) of tungsten, preferably 0.4 to 5% by weight of tungsten, and has a coercive force (Hc) as high as about 250 to about 540 Oe.

The invention is effective in that when at least one additional additive of copper and zinc is further contained in the chromium dioxide product containing tungsten, the coercive force can be enhanced by approximately 100 Oe. at the maximum as compared with that of the chromium dioxide product containing tungsten alone. That is, the effect of tungsten can be more itensified by introducing copper and/or zinc.

An improved magnetic chromium dioxide powder of this invention containing tungsten and copper, preferably contains 0.4 to 8% by weight of tungsten (based on the weight of chromium dioxide) and 0.1 to 4.2% by weight of copper (also based on the weight of chromium dioxide), and more preferably contains 0.4 to 5% by weight of tungsten and 0.3 to 3.5% by weight of copper.

An improved magnetic chromium dioxide powder of this invention containing tungsten and zinc, preferably contains 0.4 to 8% by weight of tungsten (based on the weight of chromium dioxide) and 0.1 to 4.1% by weight of zinc, (also based on the weight of chromium dioxide) and more preferably contains 0.4 to 5% by weight of tungsten and 0.3 to 3.3% by weight of zinc.

Further, the magnetic chromium dioxide powder of this invention contains copper and zinc together with tungsten within the specified ranges of effective amounts.

BRIEF DESCRIPTION OF THE DRAWINGS

FIG. 4 is a graph which shows the magnetic characteristics of the magnetic powder of this invention with zinc added to the chromium dioxide powder containing a fixed amount (1.1% by weight) of tungsten, and in which curve 41 indicates the relation between the content of zinc and the coercive force Hc, curve 42 the relation between the content of zinc and the residual magnetization $\sigma_r$ and curve 43 the relation between the content of zinc and the saturation magnetization $\sigma_s$.

DESCRIPTION OF THE PREFERRED EMBODIMENTS

The preparation of, and the measurements of the magnetic characteristics of, a specimen illustrated in FIG. 1 were made by methods described in Example 1 which will be hereinafter described in detail.

Figure 1:
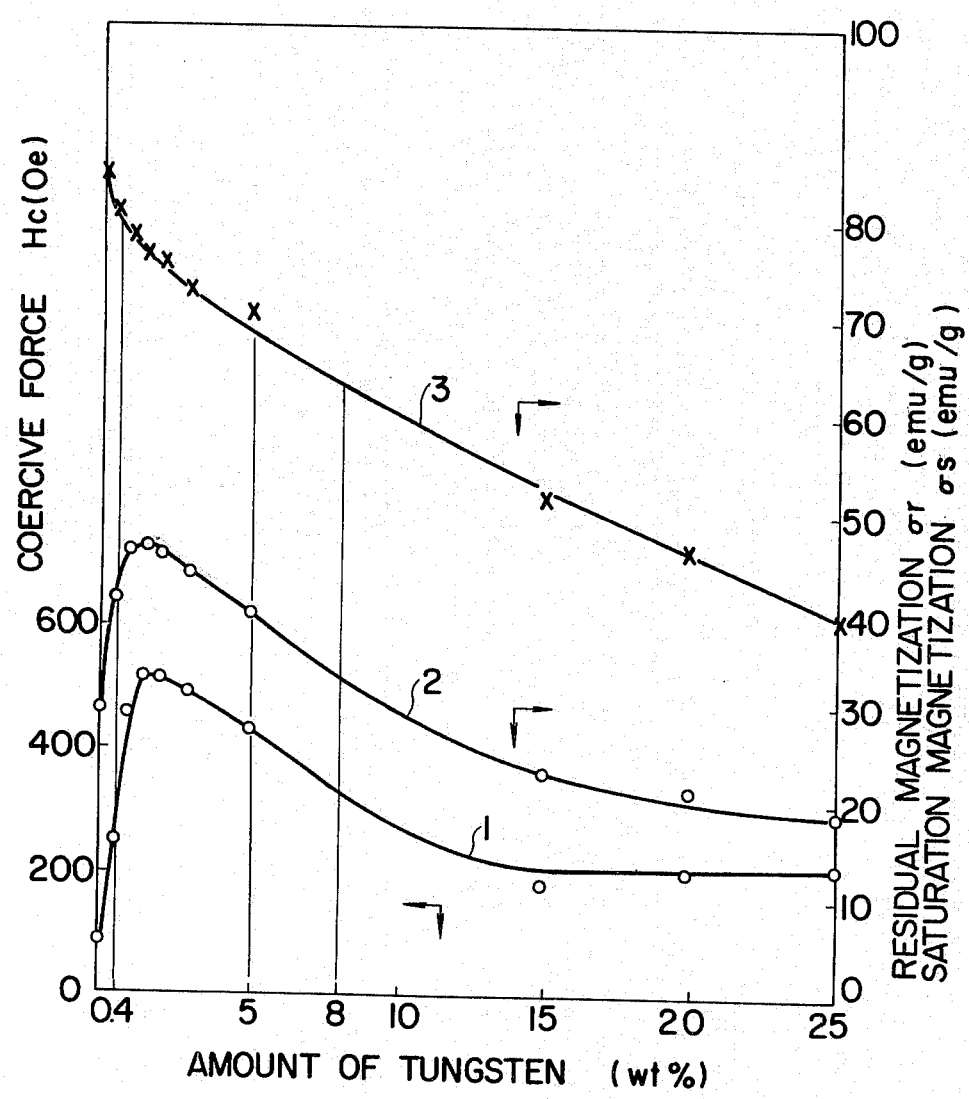
FIG. 1 is a characteristic curve diagram which shows changes in the magnetic characteristics of the magnetic powder of this invention with tungsten introduced into the ferromagnetic chromium dioxide, and in which curve 1 indicates the coercive force, curve 2 the residual magnetization and curve 3 the saturation magnetization.

As apparent from the curve diagram in FIG. 1, the influences which the introduction of tungsten exerts on the coercive force (curve 1) and the residual magnetization (curve 2) are great. Even at a slight amount of introduction, a corresponding effect is noted. In particular, the effect is remarkable at an amount of introduction over 0.4% by weight based on the weight of chromium dioxide.

Regarding the coercive force, it is about 250 Oe. at the amount of tungsten introduction of 0.4 weight %. As the amount of tungsten introduced increases beyond this value, the effect becomes more conspicuous, and the coercive force reaches a peak in the vicinity of 1.5 weight %, at which a coercive force of approximately 540 Oe. is obtained. When the amount of introduction is further increased, the effect decreases gradually, and the coercive force becomes 460 Oe. at 5 weight %, about 340 Oe. at 8 weight %, about 250 Oe. at 11.4 weight % and about 200 Oe. at 15 weight %.

On the other hand, regarding the residual magnetization, the introduction of 0.4 weight % of tungsten increases the residual magnetization of the product by approximately 41% on the basis of a case where no tungsten (as shown by curve 2). The effect reaches a peak in the vicinity of 1.5 weight %, at which the rate of increase is approximately 62%. When the amount of introduction is further increased, the effect decreases gradually in the same tendency as in the case of the coercive force. The rate of increase is about 38% at the amount of introduction of 5 weight %, and is about 14% at the amount of introduction of 8 weight %. Quite no effect is noted at an amount of introduction of approximately 10 weight %, and when the amount of introduction is still increased, a reverse effect is undesirably produced.

Regarding the saturation magnetization (curve 3), there is the tendency that as the amount of introduction of tungsten increases, the saturation magnetization value decreases gradually. Since, however, both the coercive force and the residual magnetization are remarkably enhanced within the range of the amounts of introduction of tungsten of from 0.4 to 8 weight %, it can be said, when the magnetic powder is synthetically judged as one for magnetic recording media, that at some sacrifice of the characteristic of the saturation magnetization, the ferromagnetic chromium dioxide containing the specified suitable amount of tungsten is an extraordinarily excellent magnetic powder. A more preferable amount of introduction of tungsten ranges from about 0.4 to about 5 weight %, and a particularly preferable amount ranges from about 1 to about 3 weight %. In the particularly preferable range, the magnetic characteristics of a coercive force of at least 460 Oe., a residual magnetization of at least approximately 44 emu/g and a saturation magnetization of at least approximately 73 emu/g are obtained.

In general, magnetic recording media need to exhibt substantial coercive force, residual magnetization and saturation magnetization values. Among these characteristics, the coercive force and the residual magnetization are especially important, and both should desirably be large.

Considering these points, the magnetic chromium dioxide powder of this invention containing about 0.4 to about 8 weight % of tungsten achieves remarkable enhancement in the characteristics in comparison with conventional products.

The magnetic powder of this invention is obtained in such way that at least one of tungsten and a tungsten compound is added to and mixed with chromium oxides, such as $Cr_3O_8$ and $Cr_2O_5$, in which the average valence lies in a range of 4.4 – 6.0, and the resulting mixture is subsequently thermally treated, e.g. decomposed or converted, at a temperature of about 400°C. (usually, 300° – 450°C.) under the presence of water. Since the tungsten component added at the compounding of the raw material remains mostly in the thermally-treated product finally obtained, the control of the amount of introduction of tungsten can be easily made at the compounding of the starting material. Thus, for example, 0.4 to 8 weight % of tungsten or a corresponding amount of tungsten oxide or a compound which is convertible to the oxide by firing can be added to the chromium oxide component in order to make the resulting mixture subjected to the thermal treatment process in accordance with the present invention.

Used in the raw material as the tungsten component are the metal powders of tungsten and tungsten compounds. The tungsten compounds may be any number of compounds containing tungsten, such as $WO_2$, $WO_3$, $CaWO_4$, $MgWO_4$, $H_2WO_4$, $WCl_6$, $K_2WO_4$ and $Na_2WO_4$. In case of employing the tungsten compounds, they may be compounded so that the amount of tungsten in which they are calculated may become 0.4 – 8 weight % with respect to the raw chromium oxide component material as stated previously. In general, the tungsten and the tungsten compounds bring forth a greater effect when they are mechanically pulverized well beforehand and are then added to the raw chromium oxide material. As pulverizers for use in the mechanical pulverization, there are included a ball mill, vibration mill, rod mill, rod mill, impact mill, cutter mill, mortar and so forth. In this case, it is especially effective to pulverize the material in the wet system.

The preparation of, and the measurements of the magnetic characteristics of, a specimen referred to in FIG. 2 were made by methods described in Example 3 which will be hereinbelow described.

As apparent from the curve diagram, copper greatly influences the enhancement of the coercive force by tungsten even at a slight content, and has a remarkable effect. For example, when about 0.1 to about 4.2 weight % of copper is contained with this product, the coercive force increases by at least 20 Oe. When it is contained at about 0.3 to about 3.5 weight % of a more preferable range, the coercive force increases by at least 50 Oe. When it is contained in an amount approximately 1.5 weight % which is particularly preferable, the coercive force increases by about 100 Oe.

The residual magnetization and the saturation magnetization have the tendency of gradually decreasing with the increase of the content of copper.

Figure 3:
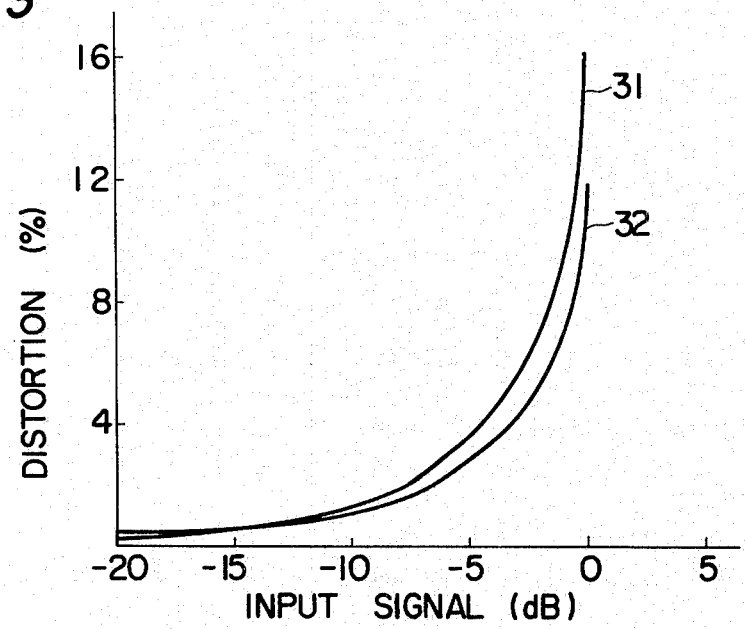
FIG. 3 is a curve diagram which shows results obtained in such way that audio cassette tapes were manufactured for trial by the use of the magnetic powder of the present invention and that the relations in the tapes between the magnitude of an input signal and the distortion of a reproduced signal at 333 Hz were measured by a tape tester, and in which curve 31 is the characteristic curve of the case of the magnetic powder containing tungsten alone and curve 32 the characteristic curve of the case of the magnetic powder containing tungsten as well as copper.

FIG. 3 is a diagram which exemplifies to what extent it is advantageous as magnetic recording materials to increase the coercive force of chromium dioxide by adding copper thereto. Shown in the figure are results obtained in such way that using two kinds of magnetic chromium dioxide powder of different coercive forces, audio cassette magnetic tapes were manufactured for trial by a conventional method, and that the relations in the tapes between the magnitude of an input signal and the distortion of a reproduced signal (the third higher harmonic distortion) were measured at a frequency of 333 Hz. In the figure, curve 31 indicates the characteristic concerning the tape manufactured with the magnetic chromium dioxide powder containing 1.1 weight % of tungsten (coercive force: 475 Oe.), while a curve 32 indicates the characteristic concerning the tape manufactured with the magnetic chromium dioxide powder containing 1.1 weight % of tungsten and 4.2 weight % of copper (coercive force: 498 Oe.).

As also apparent from the figure, the distortion of the tape employing the magnetic chromium dioxide powder with the coercive force of 498 Oe. is approximately three-fourths of that of the tape in the case of the coercive force of 475 Oe.

As understood from the above description, the magnetic chromium dioxide powder of this invention in which the coercive force is increased by adding tungsten and copper is greatly enhanced in the magnetic recording characteristic, though it is somewhat degraded in the residual magnetization and the saturation magnetization.

The foregoing magnetic powder of this invention is obtained in such way that at least one of tungsten and a tungsten compound and at least one of copper and a copper compound are added to and mixed with chromium oxides, such as $Cr_3O_8$ and $Cr_2O_5$, in which the average valence of chromium lies in a range of 4.4 – 6.0, and that the mixture is subsequently decomposed thermally at a temperature of about 400°C. (usually, 300 – 450°C.) under the presence of water. Since the tungsten and copper components added at the compounding of the raw material remain mostly in the thermally-decomposed product finally obtained, the control of the contents of tungsten and copper can be easily made during the compounding of the starting materials.

Used as the raw material of tungsten are the powdered element tungsten and the compounds of tungsten as previously mentioned.

Used as the raw material of the copper component are the powders of copper and compounds of copper. The copper compounds may be any number of compounds containing copper, such as $CuO$, $Cu_2O$, $Cu(OH)_2$ and $CuCO_3.Cu(OH)_2.H_2O$.

The preparation of, and the measurements of the magnetic characteristics of, a specimen illustrated in FIG. 4 were made by methods described in Example 6.

As apparent from the curve diagram, zinc greatly affects the enhancement of the coercive force by tungsten even with a minute content, and has a remarkable effect. When about 0.1 to about 4.1 weight % of zinc is contained within the product, the coercive force increases by at least 20 Oe. When zinc of a more preferable range of about 0.3 to about 3.3 weight % is contained, the coercive force increases by at least 50 Oe. When zinc is contained at approximately 1.7 weight % which is particularly preferable, the coercive force increases by 80 Oe.

The residual magnetization and the saturation magnetization have the tendency of gradually decreasing with the increase of the content of zinc.

For the sake of comparison, the influence of zinc on the coercive force in the case of adding zinc alone without adding tungsten was studied. Then, it was revealed that the single addition of zinc has quite no effect.

Figure 5:
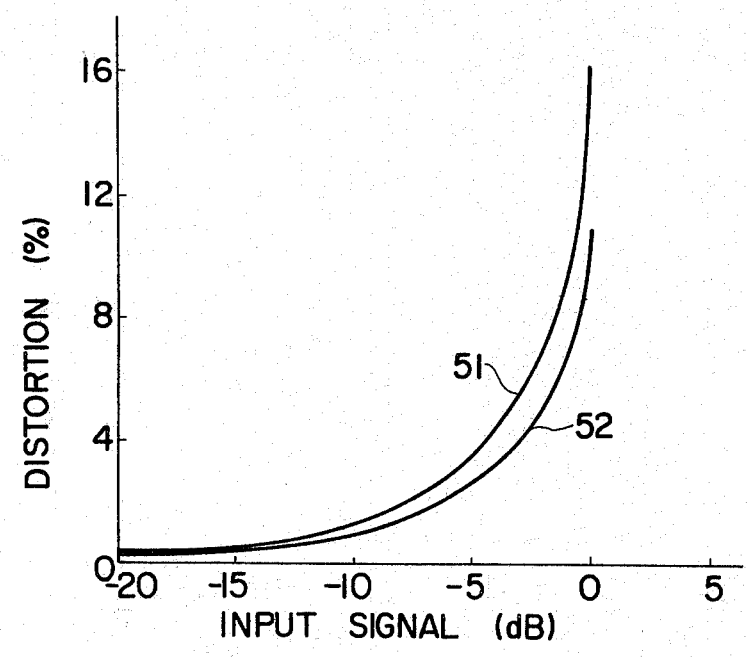
FIG. 5 is a curve diagram similar to that of FIG. 3, which shows results obtained in such way that audio cassette tapes were manufactured for trial with the magnetic powder of the present invention and that the relations in the tapes between the magnitude of an input signal and the distortion of a reproduced signal at 333 Hz were measured by a tape tester, and in which curve 51 is the characteristic curve of the case of the magnetic powder containing tungsten alone and curve 52 the characteristic curve of the case of the magnetic powder containing tungsten as well as zinc.

FIG. 5 is a diagram which exemplifies to what extent it is advantageous as magnetic recording materials to increase the coercive force of chromium dioxide by adding zinc thereto. It shows results obtained in such a way that using two kinds of magnetic chromium dioxide powder of different coercive forces, audio cassette magnetic tapes were manufactured for trial by the conventional method, and that the relations in the tapes between the magnitude of an input signal and the distortion of a reproduced signal (the third higher harmonic distortion) were measured at a frequency of 333 Hz. In the figure, curve 51 indicates the characteristic concerning the tape manufactured with the magnetic chromium dioxide powder containing 1.1 weight % of tungsten (coercive force: 475 Oe.), while curve 52 indicates the characteristic concerning the tape measured with the magnetic chromium dioxide powder containing 1.1 weight % of tungsten and 4.0 weight % of zinc (coercive force: 500 Oe.).

As also seen in the figure, the distortion of the tape employing the magnetic chromium dioxide powder with the coercive force of 500 Oe. is approximately three-fourths of that of the tape in the case of the coercive force of 475 Oe.

As understood from the foregoing, the magnetic chromium dioxide powder with the coercive force increased by adding tungsten and zinc is roll enhanced in the magnetic recording characteristic, though it is degraded in the residual magnetization and the saturation magnetization to some extent.

The magnetic powder of this invention is obtained in such way that at least one of tungsten and a tungsten compound and at least one of zinc and a zinc compound are added to and mixed with chromium oxides, such as $CrO_3$ and $Cr_2O_5$, in which the average valence of chromium lies in a range of 4.4 – 6.0, and that the mixture is subsequently decomposed or converted thermally at a temperature of about 400°C. (usually, 300 – 450°C.) in the presence of water. Since the tungsten and zinc components added at the compounding of the raw material remain mostly in the thermally-decomposed product finally obtained, the control of the contents of tungsten and zinc can be easily conducted at the compounding of the starting material.

Used as the material of the tungsten component are the metal powder of tungsten and the compounds thereof as previously mentioned.

As the raw material of the zinc component, there are used the metal powder of zinc and compounds of zinc. The zinc compounds may be any number of compounds containing zinc, such as $ZnO$, $ZnCO_3$, $ZnSiO_4$, $ZnSO_4$ and $ZnI_2$.

As has thus far been explained, the ferromagnetic chromium dioxide of this invention is modified by tungsten, and is further modified by copper or zinc in order to enhance the effect of the tungsten introduction. The amount of introduction of copper is about 0.1 to about 4.2 weight %, while the amount of introduction of zinc is about 0.1 to about 4.1 weight %, and in this invention, copper and zinc may be simultaneously introduced together with tungsten within the ranges of the effective amounts of copper and zinc.

This invention will now be described more in detail in connection with examples.

EXAMPLE 1

The metal powder of tungsten was subjected to a ball mill treatment under the presence of water for 5 days, and the treated material was made the raw material of tungsten. On the other hand, as the raw material of chromium oxide, there was used one which was obtained by carrying out such heat treatment that chromic anhydride ($CrO_3$) had its temperature raised up to 330°C. in the air at a temperature raising rate of 40°C./hr. beforehand and that it was maintained at the temperature for two hours. The chromium oxide could be essentially regarded as $Cr_2O_5$, the atomic ratio between chromium and oxygen was 1 : 2.45 according to chemical analysis, and it contained the oxide $Cr_2O_5$ as its main constituent and a minute amount of substance of unknown structure as a sub-constituent according to X-ray diffraction.

Using the tungsten raw material and the chromium dioxide raw material, ferromagnetic chromium dioxide containing tungsten was synthesized in the following conditions. The raw oxide chromium material and tungsten of the amounts given on the axis of abscissas in FIG. 1 on the basis of the weight of the raw chromium oxide material, were mixed in a mortar. That is, to the chromium oxide tungsten was added so that the content of tungsten in a chromium dioxide product might become the amounts indicated on the axis of abscissa in FIG. 1. 4 gr. of the mixture and 0.8 ml. of water were filled into a quartz tube of about 5.0 gr. (an internal volume of about 6 ml.), and such tube was hermetically sealed in a pressure-tight vessel having an internal volume of about 8.0 ml. The pressure-tight vessel had the temperature raised up to 400°C. at a temperature raising rate of 160°C./hr. in an electric furnace, and was held at the temperature for three hours. The vessel was cooled, and each specimen produced was taken out of the vessel, washed by water and dried at approximately 80°C. The magnetic powder thus obtained was composed of chromium dioxide containing tungsten as a sub-component. The magnetic characteristics of magnetic powder thus obtained, are shown in FIG. 1. The curve 1 in the figure indicates the coercive force Hc, the curve 2 the residual magnetization $\sigma_r$, and the curve 3 the saturation magnetization $\sigma_s$. These magnetic characteristics were measured in a magnetic field with the maximum value of 2,000 Oe. at room temperatures by the use of a DC magnetic hysteresis loop tracer.

On each specimen obtained, the composition of constituent elements was analyzed by the fluorescence X-ray analysis. Then, it was noted that the greater part of tungsten added at the compounding of the raw material remained in the magnetic powder. It is believed that the tungsten is bonded with oxygen in the magnetic powder crystal.

As apparent from the figure, the composition containing 0.4 – 8 weight %, more preferably 0.4 – 5 weight % of tungsten has excellent properties as a magnetic recording medium.

EXAMPLE 2

As the raw chromium oxide material, there was used one which was manufactured as in Example 1 except that the heat treatment temperature was 340°C.

As the raw tungsten materials, there were employed tungsten materials made by Company A and by Company B as were not subjected to the pulverizing treatment and the tungsten material made by Company A as was subjected to the same pulverizing treatment as in Example 1.

Ferromagnetic chromium dioxide was produced similarly to the previous example except that the tungsten materials were added by 2% on the basis of the weight of the chromium dioxide. As the result of the fluorescence X-ray analysis, tungsten was contained by 2 weight % in any of these specimens.

The magnetic characteristics of the specimens obtained, are as given in Table 1. As understood from the table, the tungsten material subjected to the pulverizing treatment has a larger effect of increasing the coercive force, but even when no special pulverization is done, chromium dioxide having a satisfactorily high coercive force can be acquired.

Table 1

| Specimen Nos. | Additives | Pulverization | Coercive Force Hc (Oe.) | Saturation Magnetization $\sigma_s$(emu/g) |
|---|---|---|---|---|
| 1 | made by Company A | not done | 472 | 73.8 |
| 2 | Company B | not done | 431 | 73.2 |
| 3 | Company A | done | 511 | 76.5 |

EXAMPLE 3

As the raw material of chromium oxide, there was used one which was obtained in such a way that, as in Example 1, chromic anhydride ($CrO_3$) was heat-treated at 330°C. in the air beforehand. The resulting oxide of chromium could be essentially regarded as $Cr_2O_5$, the atomic ratio between chromium and oxygen was approximately 1 : 2.5 according to the chemical analysis, and the chromium oxide contained the oxide $Cr_2O_5$ as its main constituent and a minute amount of substance of unknown structure as its sub-constituent according to the X-ray diffraction.

As the raw material of tungsten, there was used tungsten of a commercially available product (99.99% in purity). Used as the raw material of copper was CuO of a commercially available product.

Using the tungsten material, the copper oxide material and the chromium oxide, ferromagnetic chromium dioxide containing tungsten and copper was synthesized under the following conditions. To the chromium oxide, tungsten was added so that the content of tungsten in a chromium dioxide product might become 1.1 weight % and copper oxide was added so that the contents of copper in the chromium dioxide product might become the amounts indicated on the axis of abscissas in FIG. 2. The materials were mixed in a mortar. 4 gr. of the mixture and 0.8 ml. of water were packed into a quartz tube having an internal volume of about 6 ml. Such tube was hermetically sealed in a pressure-tight vessel having an internal volume of about 8 ml. The pressure-tight vessel had the temperature raised up to 375°C. at a temperature raising rate of 160°C/hr. in an electric furnace, and was kept at the temperature for three hours. The vessel was cooled, and each specimen produced was taken out of the vessel, washed by water and dried at about 80°C. The magnetic characteristics of magnetic powder thus obtained, are shown in FIG. 2. The curve 21 in the figure indicates the coercive force Hc, the curve 22 the residual magnetization $\sigma_r$, and the curve 23 the saturation magnetization $\sigma_s$. These magnetic characteristics were measured in a magnetic field with the maximum value of 2,000 Oe. at room temperatures by means of a DC magnetic hysteresis tracer.

Figure 2:
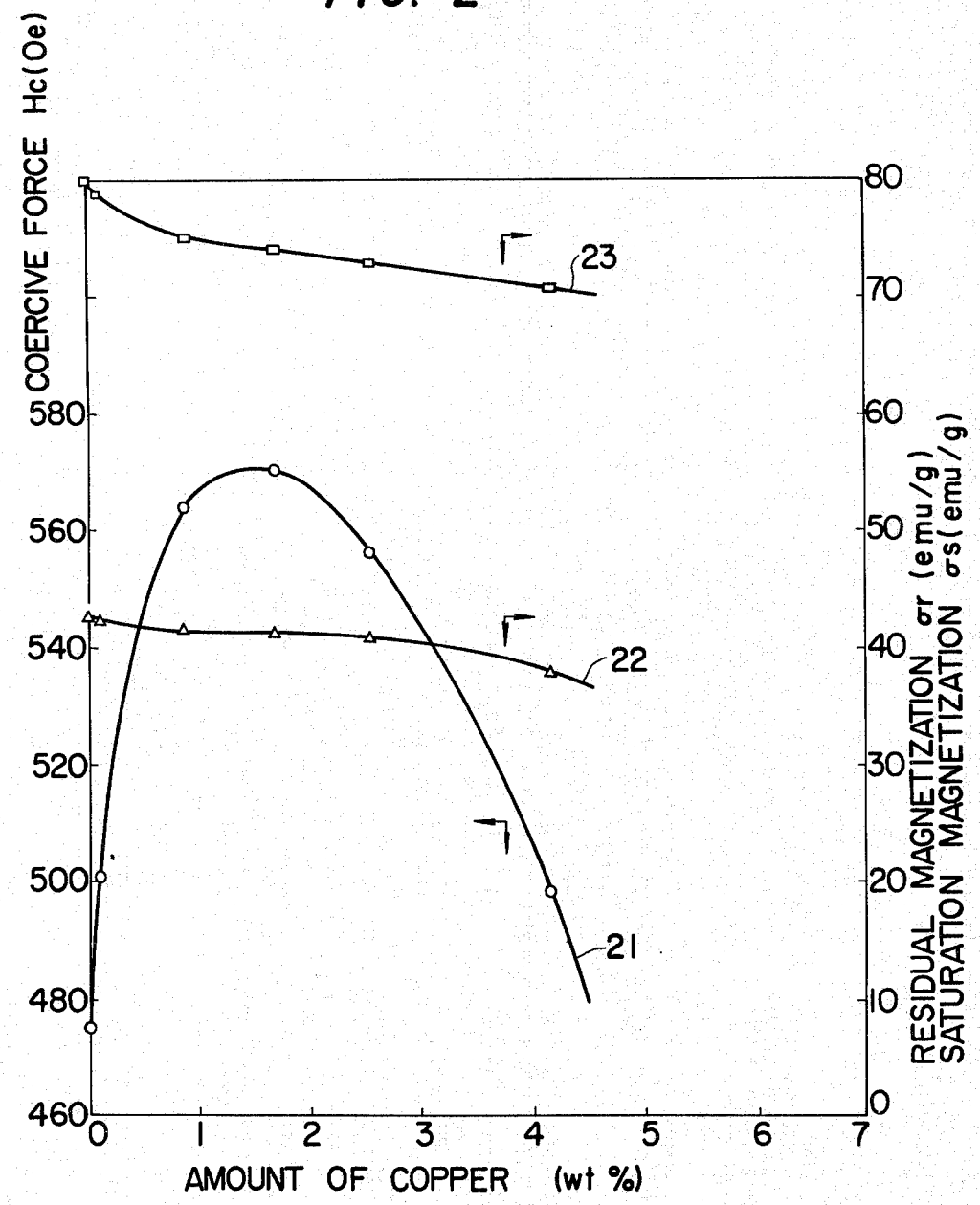
FIG. 2 is a graph which shows the magnetic characteristics of the magnetic powder of this invention with copper added to the chromium dioxide powder containing a fixed amount (1.1% by weight) of tungsten, and in which curve 21 indicates the relation between the content of copper and the coercive force Hc, curve 22 the relation between the content of copper and the residual magnetization $\sigma_r$ and curve 23 the relation between the content of copper and the saturation magnetization $\sigma_s$.

FIG. 3 illustrates the results obtained in such way that using two kinds of magnetic dioxide powder of different coercive forces as illustrated in FIG. 2, audio cassette tapes were manufactured for trial, and that the relations in the tapes between the magnitude of an input signal and the distortion of a reproduced signal at 333 Hz were measured by a tape tester. In the figure, the curve 31 corresponds to the tape manufactured with the magnetic chromium dioxide powder containing 1.1 weight % of tungsten (coercive force: 475 Oe.), while the curve 32 corresponds to the tape manufactured with the magnetic chromium dioxide powder containing 1.1 weight % of tungsten and 4.2 weight % of copper (coercive force: 498 Oe.).

As apparent from FIGS. 2 and 3, the powder containing tungsten and copper has excellent properties as magnetic recording media.

The constituent elements of the magnetic powder obtained, were analyzed with flourescence X-rays. Then, it was noted that the greater parts of tungsten and copper added at the compounding of the raw material remained in the magnetic powder. It is believed that the tungsten and copper are bonded with oxygen in the magnetic powder crystal.

EXAMPLE 4

As the raw chromium oxide material, there was used one which was manufactured as in Example 3. As the raw tungsten material, there was used one which was obtained in such way that 2N - HCl was added to an aqueous $K_2WO_4$ solution to form a deposit, and that the deposit was heat-treated in a current of hydrogen at 550°C. for five hours. As the raw copper material, there was used $Cu_2O$ of a commercially available product.

1.5 weight % of tungsten and 2.0 weight % of $Cu_2O$ were added to the chromium oxide, and the materials were mixed in a mortar.

The mixture was heat-treated as in Example 1, and the magnetic characteristics of magnetic powder obtained were measured as in Example 3. The results were as follows:

| | |
|---|---|
| Coercive Force (Hc) | 562 Oe. |
| Residual Magnetization ($\sigma_r$) | 39.8 emu/g |
| Saturation Magnetization ($\sigma_s$) | 72.8 emu/g |

As apparent from the results, the magnetic chromium dioxide powder having a sufficiently large coercive force is acquired by adding tungsten and copper.

EXAMPLE 5

As the raw chromium oxide material, there was employed one which was manufactured as in Example 3 except that the heat treatment temperature was 320°C. Used as the raw tungsten material was $WO_2$ of a commercially available product. As the raw copper material, $Cu(OH)_2$ of a commercially available product was used.

2.0 weight % of $WO_2$ and 2.5 weight % of $Cu(OH)_2$ were added to the chromium oxide raw material, and these materials were mixed in a mortar. The mixture was heat-treated as in Example 3, and the magnetic characteristics of magnetic powder obtained were measured as in Example 3. The results were as follows:

| | |
|---|---|
| Coercive Force (Hc) | 551 Oe. |
| Residual Magnetization ($\sigma_r$) | 39.0 emu/g |
| Saturation Magnetization ($\sigma_s$) | 71.4 emu/g |

As apparent from the results, the magnetic chromium dioxide powder which has a sufficiently large coercive force as in Example 4 can be obtained by adding tungsten and copper.

As further raw copper materials, $CuCO_3$ and $Cu(OH)_2.H_2O$ were also used. In each case, an effect equivalent to that in the above example was noted.

EXAMPLE 6

As the raw material of chromium oxide, there was used one which was obtained in the same way as that in Example 1, chromic anhydride ($CrO_3$) was heat-treated at 330°C. in the air beforehand. The oxide of chromium could be essentially regarded as $Cr_2O_5$, the atomic ratio between chromium and oxygen was approximately 1 : 2.5 according to the chemical analysis, and the chromium oxide contained the oxide $Cr_2O_5$ as its main constituent and a minute amount of substance of unknown structure as its sub-constituent according to the X-ray diffraction.

As the raw material of tungsten, W of a commercially available article (at a purity of 99.99%) was used. Used as the raw material of zinc was ZnO of a commercially available article.

Using the W material, the ZnO material and the oxide of chromium thus obtained, ferromagnetic chromium dioxide containing tungsten and zinc was synthesized in the following conditions. To the chromium oxide, W was added so that the content of tungsten in the chromium dioxide product might become 1.1 weight %, and ZnO was added so that the contents of zinc in the chromium dioxide product might become the amounts indicated on the axis of abscissas in FIG. 4. The materials were mixed in a mortar. 4 gr. of the mixture and 0.8 ml. of water were packed into a quartz tube having an internal volume of approximately 6 ml. This tube was hermetically sealed in a pressure-tight vessel having an internal volume of approximately 8 ml. The pressure-tight vessel had the temperature raised up to 375°C. at a temperature raising rate of 160°C./hr. in an electric furnace, and was held at the temperature for 3 hours. After cooling the vessel, each specimen produced was taken out of the vessel, it was washed by water, and it was dried at about 80°C. The magnetic characteristics of magnetic powder thus obtained, are shown in FIG. 4. The curve 41 in the figure indicates the coercive force Hc, the curve 42 the residual magnetization $\sigma_r$, and the curve 43 the saturation magnetization $\sigma_s$. These magnetic characteristics were measured in a magnetic field with the maximum value of 2,000 Oe. at room temperature by employing a DC magnetic hysteresis tracer.

FIG. 5 illustrates the results obtained with two kinds of magnetic chromium dioxide powder of different coercive forces as illustrated in FIG. 4, audio cassette tapes were manufactured for trial, and that the relations in the tapes between the magnitude of an input signal and the distortion of a reproduced signal at 333 Hz were measured by a tape tester. In the figure, the curve 51 corresponds to the tape manufactured with the magnetic chromium dioxide powder containing 1.1 weight % of tungsten (coercive force: 475 Oe.), while the curve 52 corresponds to the tape manufactured with the magnetic chromium dioxide powder containing 1.1 weight % of tungsten and 4.0 weight % of zinc (coercive force: 500 Oe.).

As apparent from FIGS. 4 and 5, the powder containing tungsten and zinc has excellent properties as magnetic recording media.

The constituent elements of the magnetic powder obtained, were analyzed with fluorescence X-rays. Then, it was noted that the greater parts of tungsten and zinc added, i.e. within the indicated effective amounts, at the compounding of the raw materials remained in the magnetic powder. It is believed that the tungsten and zinc are bonded with oxygen in the magnetic powder crystal.

EXAMPLE 7

As the raw chromium oxide material, there was used one which was manufactured as in Example 6 except that the heat treatment temperature was 320°C. As the raw tungsten material, there was used $WO_2$ being a commercially available product. Used as the raw zinc material was Zn being a commercially available product.

2.0 weight % of $WO_2$ and 1.5 weight % of Zn were added to the chromium oxide, and these materials were mixed in a mortar. The mixture was heat-treated similarly to Example 1, and the magnetic characteristics of magnetic powder obtained were measured similarly to Example 1. The results were as follows:

| | |
|---|---|
| Coercive Force (Hc) | 557 Oe. |
| Residual Magnetization ($\sigma_r$) | 39.4 emu/g |
| Saturation Magnetization ($\sigma_s$) | 72.0 emu/g |

As apparent from the results, the magnetic chromium dioxide powder with a sufficiently large coercive force is acquired by adding tungsten and zinc.

EXAMPLES 8 to 10

As the raw chromium oxide material, the same one as in Example 7 was used. As the raw tungsten material and the raw zinc material, the same ones as in Example 6 were used.

Tungsten and/or zinc in amounts given in Table 2 were added to the chromium oxide, and these materials were mixed in a mortar. The mixture waas heat-treated as in Example 6, and the was characteristics of magnetic powder obtained were measured as in Example 6. The results are also given in Table 2.

Table 2

| | Magnetic Characteristics of Magnetic $CrO_2$ Powder | | | | |
|---|---|---|---|---|---|
| Nos. | Amount of Addition of W (weight %) | Amount of Addition of ZnO (weight %) | Coercive Force Hc (Oe.) | Residual Magnetization $\sigma_r$ (emu/g) | Saturation Magnetization $\sigma_s$ (emu/g) |
| 8 | 0.9 | 2.0 | 581 | 40.2 | 72.2 |
| 9 | 0.9 | — | 442 | 40.7 | 78.9 |
| 10 | — | 2.0 | 64 | 21.2 | 82.0 |

As apparent from Table 2, the composition containing both the components of tungsten and zinc is far larger in the coercive force than the composition containing tungsten alone. The chromium dioxide in which only zinc is introduced without introducing tungsten has an extremely small coercive force, and lacks usefulness as a magnetic recording medium.

In the above examples, metallic zinc powder and zinc oxide have been mentioned as the row zinc material. However, an effect equivalent to those of the examples has also been achieved with other zinc compounds, such as $ZnCO_3$, $ZnSiO_4$, $ZnSO_4$ and $ZnI_2$.

EXAMPLE 11

Using 1 weight % of zinc powder and 0.5 weight % of copper powder instead of 1.5 weight % of zinc powder in Example 7, ferromagnetic chromium dioxide modified by the three elements of tungsten, copper and zinc was obtained in the same way as in Example 7. The magnetic characteristics of the magnetic powder were substantially equal to those in Example 7.

It will be recognized from the above examples that the amount of water used may vary considerably. Generally, the water is substantially less, but in some cases more than the amount of chromium oxide component, e.g. note that described in U.S. Pat. No. 3,117,093.

While the novel principles of the invention have been described, it will be understood that various omissions, modifications and changes in these principles may be made by one skilled in the art without departing from the spirit and scope of the invention.

What is claimed is:

1. A magnetic recording medium comprising a composition of ferromagnetic chromium dioxide containing about 0.4 to about 8 weight percent of tungsten, based on the weight of chromium dioxide, and an effective amount of at least one member selected from the group consisting of copper and zinc to improve the intrinsic coercive force of the tungsten modified ferromagnetic chromium dioxide.

2. The magnetic recording medium of claim 1, wherein said composition contains about 0.4 to about 8 weight percent of tungsten, said composition further containing about 0.1 to about 4.2 weight percent of copper, said weight percents being based on the weight of chromium dioxide.

3. The magnetic recording medium according to claim 2, in which the amount of copper is about 0.3 to about 3.5 weight percent.

4. The magnetic recording medium of claim 1, wherein said composition contains about 0.4 to about 8 weight percent of tungsten, said composition further containing about 0.1 to about 4.1 weight percent of zinc, said weight percents being based on the weight of chromium dioxide.

5. The magnetic recording medium according to claim 4, in which the amount of zinc is about 0.3 to about 3.3 weight percent.

\* \* \* \* \*